United States Patent [19]

Fleming

[11] 4,439,760
[45] Mar. 27, 1984

[54] METHOD AND APPARATUS FOR COMPILING THREE-DIMENSIONAL DIGITAL IMAGE INFORMATION

[75] Inventor: James R. Fleming, Indianapolis, Ind.

[73] Assignee: Bell Telephone Laboratories, Incorporated, Murray Hill, N.J.

[21] Appl. No.: 265,247

[22] Filed: May 19, 1981

[51] Int. Cl.$^3$ .............................................. G09G 1/28
[52] U.S. Cl. .................................. 340/799; 340/703; 340/750; 340/747; 340/717
[58] Field of Search ............... 340/701, 703, 717, 748, 340/747, 750, 825.5, 825.51, 723, 724, 725, 729, 798, 799; 370/85, 91

[56] References Cited

U.S. PATENT DOCUMENTS

| | | | |
|---|---|---|---|
| 3,925,776 | 12/1975 | Swallow | 340/703 |
| 3,944,997 | 3/1976 | Swallow | 340/703 |
| 4,074,233 | 2/1978 | Swain | 340/825.51 |
| 4,217,577 | 8/1980 | Roe et al. | 340/703 |
| 4,222,048 | 9/1980 | Johnson | 340/747 |
| 4,240,140 | 12/1980 | Stafford et al. | 364/200 |
| 4,317,114 | 2/1982 | Walker | 340/721 |
| 4,324,401 | 4/1982 | Stubben et al. | 273/85 |

OTHER PUBLICATIONS

Computer Design, "Semiconductor Advances Boost Digital Image Processing System Performance," Sep. 1979, pp. 93-101, by Harry C. Andrews.
Computer Design, "Bit Map Architecture Realizes Raster Display Potential," Jul. 1980, pp. 111-117, by Robert J. Gray.
IEEE Catalog No. EHO 156-0, "Interactive Computer Graphics," pp. 149-150, 201-202, and 331, by Herbert Freeman.
Electronics, "Video Display Processor Simulates Three Dimensions," Nov. 20, 1980, pp. 123-126, by Karl Guttag and John Hayn.

Primary Examiner—Marshall M. Curtis
Attorney, Agent, or Firm—H. L. Newman; S. R. Williamson

[57] ABSTRACT

A method and apparatus, comprising a video data bus (8), a plurality of video memory modules (VM1-VMN), and bus arbitration circuits (BAC1-BACN) associated with each video memory module, are disclosed for compiling digital image information for display. A data processor (1) addresses the plurality of video memory modules over a processor data bus (2), the data processor for assigning a priority value to picture element data stored in the video memory modules. Upon command of the data processor, a frame (5 to 300) of picture element data is serially compiled on the video data bus (8). Data contention between video memory modules for access to the video data bus is controlled by the bus arbitration circuits, the picture element data bidding with the highest priority value gaining access. In one embodiment, the priority value represents the depth of a point of a solid object for display and/or the relative depth of picture element data comprising the object for display. The data processor may change the priority value associated with picture element data for display as well as the coordinates of data location in the display. Accordingly, textual characters having the highest priority and solid objects having a lesser priority may appear to move in front of one another on a background having the lowest priority value without interference in a sequence of frames of information for display.

18 Claims, 4 Drawing Figures

METHOD AND APPARATUS FOR COMPILING THREE-DIMENSIONAL DIGITAL IMAGE INFORMATION

BACKGROUND OF THE INVENTION

1. Technical Field

This invention relates to digital image display systems and, more particularly, to a method and apparatus for compiling digital image information for display.

2. Description of the Prior Art

With the advent of viewdata and teletext services, a number of independently developed systems for generating digital data for display have surfaced. Stafford et al., U.S. Pat. No. 4,240,140 discloses one such system comprising CRT display terminal priority interrupt apparatus for generating vectored addresses. The Stafford system comprises a bidirectional data bus and an address bus so that video data processing subsystems are able to intercommunicate, their activities being governed by a clock and interrupt system.

Two problems remain largely unsolved in such systems. One has become known as the hidden line problem. This has been described as the problem of determining which edges of a solid, nontransparent object are visible (and which invisible) from a given vantage point. A brief history of the problem is presented in H. Freeman's, "Interactive Computer Graphics," at pages 201-202. Stated another way, it is desirable in display systems to allow a first solid object to appear to cover a second solid object; the second solid object, a third, and so on. Proposed solutions to this problem generally involve the development of complex algorithms which require considerable processor time. Roe et al., U.S. Pat. No. 4,217,577 and Johnson, U.S. Pat. No. 4,222,048 exemplify such state of the art solutions.

The time consumed in processing complex algorithms for solving the hidden line problem precludes solution of the second problem which is to provide animation in digital image display systems. The animation problem overlaps with the hidden line problem and comprises the following subset of problems: size enlargement (zooming), movement, and rotation of a solid object. These are desirable characteristics of an animated computer display system, but, as yet, practical solutions to the animation problem are not available.

Freeman, at page 331, presents a brief history of the animation problem. He suggests that present solutions to the problem include the development of sophisticated animation languages which, to a degree, increase the speed of algorithm processing. Animation processors perform complex transformations on the three dimensional surfaces of solid objects.

It is clear, however, that there remains a requirement for a viable alternative solution to the problems of the hidden line and animation. It is also desirable that such a system compliment presently suggested solutions.

SUMMARY OF THE INVENTION

The above-stated problems and related problems of the hidden line and animation are solved with the principles of the present invention, a method and apparatus for compiling digital information for display. In accordance with these principles, a plurality of video memory modules, each having an associated bus arbitration circuit provides the capability necessary for displaying animated solid state objects which freely move in depth relationship to one another. Contention between video memory modules and access to a video data bus are resolved by allowing access to that picture element (pel) data having a high assigned priority value, the priority value related to the depth of picture element data competing for display. For example, when a competition arises for a particular point in a display, the picture element data stored in various modules may attempt to gain access to a video data bus. The data having the highest priority value wins access.

The priority value need not be confined to solid objects in the present invention. Textual picture element data having a high priority value may supersede object picture element data on which it appears which in turn may supersede background picture element data. In other words, ASPEN STATION may appear on the sign of a railroad station whose background comprises hilly terrain. No algorithm processing time is required because the data arbitration occurs as a natural incident of video data transmission from video memory to a video display controller. However, under control of a data processor or separate animation processor, the enlargement, movement, and rotation of a solid object may be changed in accordance with algorithms of animation languages known in the art. For example, a boxcar of a train may grow in size and rotate as it moves across a video display. In accordance with the present invention, the priority value and, as a result, the degree of depth of the object for display may be changed. In this manner, not only is the hidden line problem solved but animation may be achieved.

DETAILED DESCRIPTION

Figure 1:
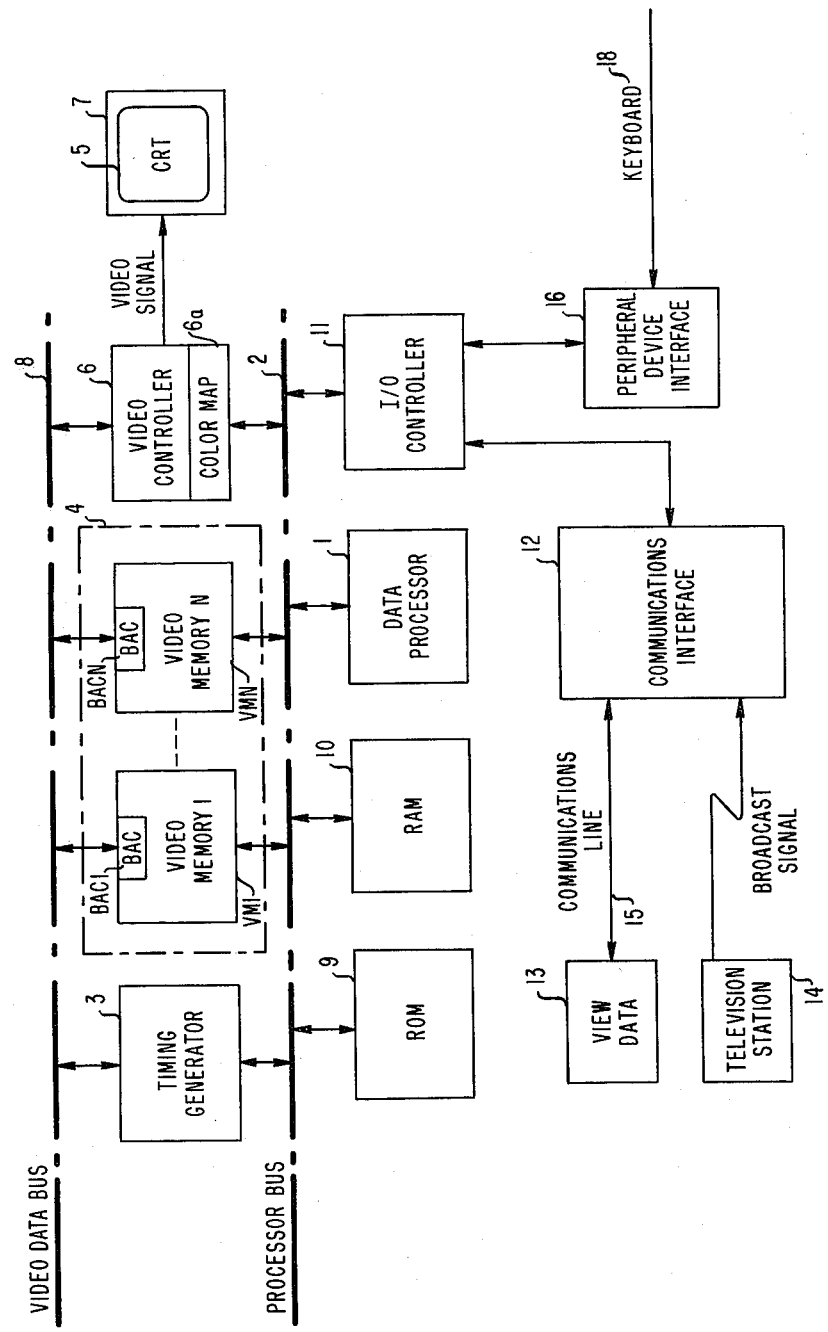
FIG. 1 is a schematic drawing and block diagram of a digital image display system employing the principles of the present invention.

Referring more particularly to FIG. 1, there is shown a schematic drawing and general block diagram of a digital image display system employing the principles of the present invention. The digital image display system comprises a data processor 1 having bi-directional access to a processor data bus 2. A separate timing generator 3 may provide the clock signals required on the processor data bus 2; however, in some systems, it may be desirable to provide timing generator capability in data processor 1. The timing generator 3 may also provide the timing signals on a video data bus 8 for use by video memory 4, which may comprise a plurality of video memory modules VM1-VMN, and by a video controller 6.

In the depicted embodiment, a bus arbitration circuit BAC1-BACN is associated with each video memory module VM1-VMN. The bus arbitration circuit resolves contention of picture element data among the several video memory modules VM1-VMN for access to the video data bus 8. The winning picture element data from the video memory 4 is compiled on the video data bus 8 for transmission to the video controller 6. The video controller 6 operates video display 7 responsive to the picture element data received over the video data bus 8. During an animation sequence of frames of picture element data, complete frames 5 of picture element information are sequentially displayed by video display 7.

Figure 3:
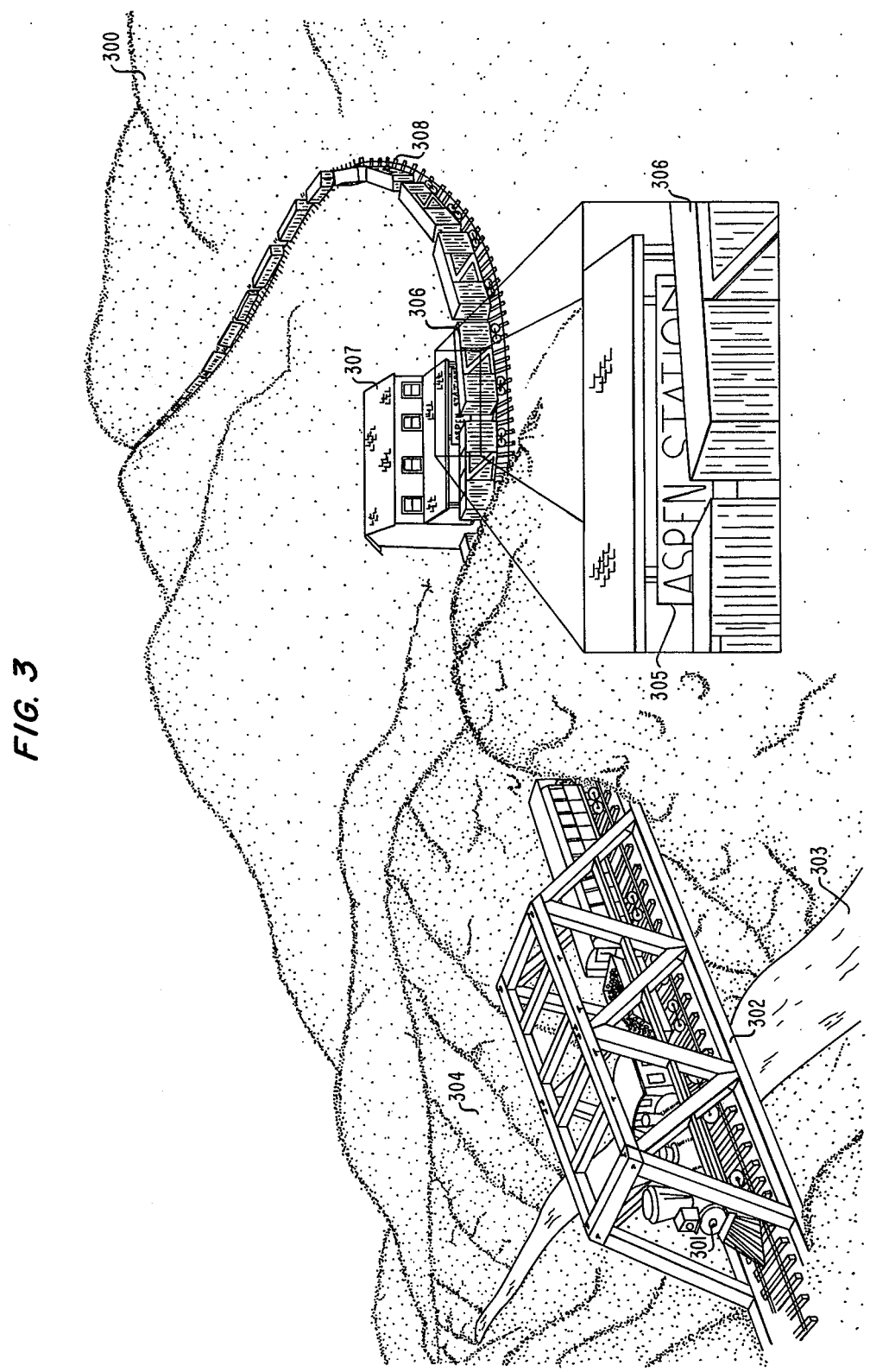
FIG. 3 is a pictorial representation of the hidden line and animation problems solved by the principles of the present invention, pictorially showing a railroad train winding around a mountain, passing a train station and crossing a bridge, the train viewable through the trestles of the bridge.

Referring briefly to FIG. 3, the operation of the above-described components and their operative relationship to a digitized image or frame for display 300 are now described. Taking for a first example the presentation of a railroad engine 301 for display, the railroad engine may be stored as picture element data in video memory 4 comprising a plurality of points on the solid surfaces of the engine as coordinates in two dimensions of X and Y as well as a third priority value related to the depth dimension. The picture element data of the bridge 302, river 303, and hilly terrain 304, may be similarly stored in video memory module VM1 (one) or other video memory modules. When a particular point of picture element data is to be displayed, the video memory 4, comprising modules VM1-VMN, is addressed and commanded to provide for display that picture element data having the highest priority value. On video data bus 8 may be provided the front trestles of the bridge 302, in preference to the engine 301, in preference to the river 303 or hilly terrain 304. The bus arbitration circuits BAC1-BACN, control the access of the picture element data to data bus 8 for display. Another arbitration example will be subsequently described after a further detailed discussion of the particular components of FIG. 1.

Referring again to FIG. 1, data processor 1 may be a microprocessor comprising program memory 9 and scratch pad or random access memory 10. The program memory may store complex animation algorithms for manipulating surfaces of solid objects, or a separate animation processor (not shown) may be provided having separate program memory. In a viewdata or teletext terminal which may be located in a residential home, it is desirable that data processor 1 be as small as possible; accordingly, a microprocessor may be assumed, the application of a separate animation processor (not shown) likely if complex animation is required. As previously described, data processor 1 may generate the timing pulses for the video display system in place of timing module 3.

Data processor 1 responds to user input from a keyboard 18, light pen or other data input device known in the art through peripheral device interface 16. In accordance with known technology, data processor 1 may modify the video memory 4, the timing generator 3 and the video controller 6 to the proper modes of operation which will allow maximum flexibility in remotely reconfiguring the terminal operating characteristics.

In its application with a viewdata or teletext terminal, the data processor 1 may also respond to input provided from a remote or centralized data base such as one located at a television broadcast station 14 or a provider of viewdata services 13. Such inputs are provided through communications interface 12. In the case of teletext services, the signal provided by a TV broadcast station 14 is received at communications interface 12 or, in the case of viewdata services 13, a data signal is received over communications line 15 at communications interface 12. Input/output controller 11 under user control provides selectable access to the various data input arrangements.

Processor data bus 2 is a bi-directional conduit through which the data processor 1 controls the video memory 4, the timing generator 3 and the video controller 6. Several bus structures may be adapted for use in the present invention. One example is the INTEL Corp. Multibus. Whichever specific bus structure is chosen, the bus generally comprises address capability, a data path and control lines which may include interrupt, reset, clock (for synchronous use), wait (for asynchronous use), and bus request lines.

A seperate timing generator module 3 may provide the timing signals on both the processor data bus 2 and the video data bus 8. It may comprise a chain of programmable logic circuits, digital dividers and counters for providing required timing signal outputs. These may, as previously discussed, be incorporated into data processor 1. For operation of the video data bus 8, a number of different timing signals are required. Horizontal and vertical drive signals are provided in accordance with horizontal and field rates respectively. A dot clock signal is provided at the dot frequency (picture element or pel rate) of the system. An odd/even field signal indicates if the odd or even field is to be displayed in an interlaced system. A composite blanking signal indicates if video is being displayed or if vertical or horizontal retrace is occurring. Also, a group clock signal or other signals may be provided. The group clock signal indicates when to access data for a new group of picture element data from memory. For example, picture element data in video memory having a slow access time may be serially provided in groups of 4, 8 or 16 picture elements. On the other hand, a parallel data transmission scheme is possible, potentially increasing the requirements for leads of video data bus 8.

Video controller 6 accepts digital image information from the video data bus 8, pel-by-pel, and converts the digital information, if necessary, to analog form for presentation on video display 7. The video controller may be in modular form and comprises three components: (1) color map memory, (2) digital to analog conversion and sample and hold circuits, if required by video display 7, and (3) a standard composite video encoder (for example, for providing NTSC standard video or red, green, blue RGB outputs) and RF modulator (if necessary, for antenna lead-in access to a television set display 7).

Color map memory comprises look-up tables in random access memory and are indexed by the pel data of coordinates and priority value entering the video controller 6. For example, if ten bits of color data are compiled per picture element, 1024 color choices are possible, eight each of red, green and blue, the primary colors. As previously discussed, the color map may be loaded and updated by the data processor 1 under local or remote control.

The color map memory output may be provided to three separate digital to analog converters, one for each primary color. In accordance with techniques generally known in the art, the RGB output may enter a monitor video display 7 directly, may be converted to a composite video signal for input to a monitor video display 7, or modulated to a particular RF frequency for input through the antenna lead-in of a television set display 7.

Video display 7, as previously discussed, may either be a monitor or a television set. In deference to the previous discussion, it may additionally comprise other forms of video display known in the art including a liquid crystal dislay or an LED display. The list is not intended to be inclusive and, if another standard format of input video signal is required, the principles of the present invention assume the capability of video controller 6 for providing such a standard video signal.

The video memory 4 comprises video memory modules VM1 to VMN. These modules generally accept input from the data processor 1 in the form of an image comprising digitized picture element information. The modules VM1 to VMN store the information until rearrangement of data occurs and periodically passes the pel information over video data bus 8 to the video controller 6. As previously indicated, the x and y coordinates and priority value of a pel are employed to index a particular color code in color map memmory, the priority value relating to the depth of the pel for display.

The video memory modules VM1 to VMN may assume a variety of structures depending on specialized functions each may perform. For example, a memory module for providing background picture element information may be of a high resolution or a low resolution type. The low resolution type requires less scratchpad or random access capacity for storage of picture element information.

A second type of memory module may be one for providing object picture element information. For example, pels comprising an engine, a railroad station, or a bridge may be defined by their x and y coordinates and a priority value indicating their relative depth. All three values, the two coordinate and priority value, in a frame 5 (FIG. 1) or 300 (FIG. 3) of video information or image for display may be operably varied under control of data processor 1 or a separate animation processor (not shown). Upon scanning the image, when corner starting coordinates of a solid object for display are reached, groups of picture element data of the particular object having the same priority value may be provided serially or in parallel over video data bus 8.

A third type of specialized memory module is a character of text generating module. This module may be addressably activated to provide a plurality of fonts of characters, mosaic block graphics characters, or downloaded symbols. In all likelihood textual characters will appear at the front of an image and will be assigned a high priority value relative to object information, graphics information, or background information. However, if it is desired, for example, in animation to have textual characters appear and disappear as, for example, when an object moves across the textual characters, the high priority value of the text may be changed to a low priority value or the object may be assigned a higher priority value than the textual characters in accordance with the principles of the present invention.

The video data bus 8 connects the timing generator 3 and the video memory 4 to the video controller 6. It comprises the following types of leads: data leads for picture elements information and for indexing into the color map memory of video controller 6, arbitration leads for providing priority value information, and timing leads for providing video timing and control. In one embodiment constructed by the inventor, which provides 1024 color choices, eight leads are provided for bus arbitration and for data transmission among eight pels (10 bits of data are transmitted serially over the 8 leads) and six leads are provided for timing and control. The six timing and control leads include the previously mentioned horizontal and vertical drive signals, the dot clock, the field signal, the composite blanking signal and the group clock signal.

Figure 2:
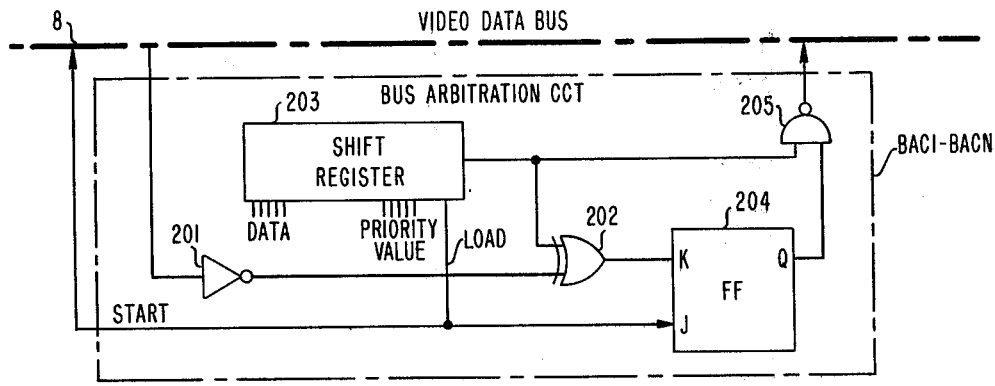
FIG. 2 is a schematic drawing of one bus arbitration circuit which may be employed in accordance with the principles of the present invention.

Each video memory module VM1 to VMN comprises a bus arbitration circuit BAC1-BACN for controlling access among competing video memory modules VM1-VMN for access to video data bus 8. Referring more particularly to FIG. 2, a schematic drawing of one bus arbitration circuit which may be employed is shown. The depicted bus arbitration circuit comprises an inverter circuit 201 for intercepting what data value is on the bus at a particular time for comparison with the transmitted data signal at exclusive OR circuit 202. Flip flop circuit 204 is initially activated by the group clock timing signal on a START lead from video data bus 8. If the comparison at exclusive OR circuit 202 indicates that the transmitted priority data value is a loser, flip flop circuit 204 deactivates the transmission of data. Shift register 203 responds to the group clock signal on LOAD lead by serially shifting priority value information for output through NAND gate 205. If the associated video memory module wins contention for access to the video data bus 8, shift register 203 continues by shifting picture element data through NAND gate 205.

Referring more particularly to FIG. 3, a pictorial representation is shown of how the present invention may be employed to solve the hidden line and animation problems of the prior art. FIG. 3 is intended to demonstrate a sequence of frames 300 for display while only one image 300 is shown. The engine example having been previously explained, an example involving textual characters 305 will now be discussed.

In this example, a box car of a train of cars may have its x and y coordinates and priority values stored in a first memory module. Data processor 1 or a separate animation processor may effectuate its reorientation so as to change its size, location, and view. The depth values of particular objects are scaled in video memory 4 to be in depth relationship to one another, the result being a priority value for bus arbitration. In other words, in a frame for display 300, a box car may appear as box car 306, box car 308, or in any other position of a train of cars. In order to perform rotation and enlargement, an animation processing capability is required for manipulating x, y, and depth values either in data processor 1 or a separate animation processor.

Text 305 comprising the characters ASPEN STATION may be assigned the same priority value. This priority value will be lower than those for any point on box car 306 passing by the railroad station sign on which the characters appear. The points comprising the railroad station 307 may be stored with the same priority value in order to conserve memory and perhaps preclude the requirement for a separate animation processor. The immobile railroad station need not be stored as a three dimensional object unless it is anticipated that its perspective view will be changed. On the other hand, the hilly terrain 304 wherever the train is anticipated to appear in an animation sequence of frames must be assigned varying priority values in order to cover the train or permit the train to be seen where appropriate.

Figure 4:
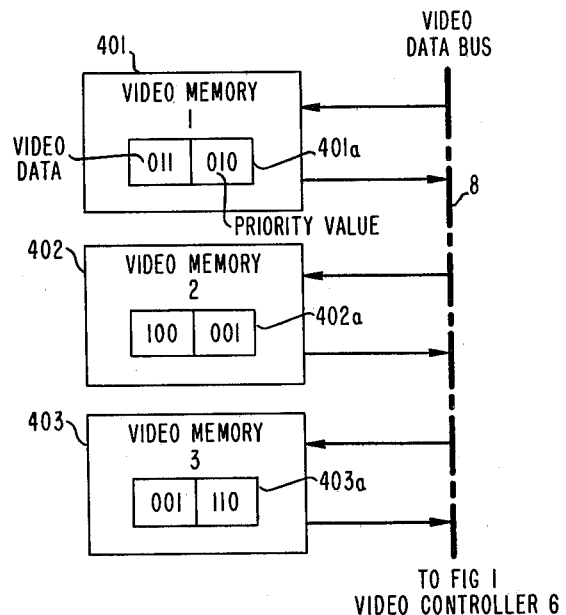
FIG. 4 is a schematic drawing and block diagram of the digital image display system of FIG. 1 showing three video memory modules contending for access to a video data bus.

Referring more particularly to FIG. 4, one example of how the present invention achieves solutions to the particularly described problems is shown. In the formation of a frame 300, picture element data is generally provided by sweeping horizontally and then through successive fields until a complete frame is transmitted. Picture element data comprising hilly terrain information 304 may be provided by a video memory module 402 for providing background data without contention initially until the topmost corner of railroad train station 307 is reached. At this point, a video memory module 403 which may store picture element data for train station 307 competes with video memory module 402 which may store data representing the hilly terrain 304.

Upon sweeping a particular character of textual information 305 reading ASPEN STATION, video memory module 401 which may store textual information 305, begins to contend. At this point in time in the sweep, all three memory modules 401, 402 and 403 are contending to have their picture element data have access to the video data bus. Taking, for example, a contention of the first character A of text 305 for access by video memory module 401, it may be assumed that the priority data value 010 is associated with video data value 011 in video memory module 401.

At video memory module 403, the railroad station data value 001 contends for access with associated priority data value 110. The hilly terrain data value 100 contends with priority data value 001 at memory module 402.

Upon receiving a group clock signal on their START and LOAD leads, shift registers 401a, 402a, and 403a respectively of video memory modules 401, 402, and 403 are loaded with data. The first bit of priority value data is loaded on to video data bus 8 which may be maintained at a high or low state. (If the bus arbitration circuit of FIG. 2 is employed, a high state must be maintained on video data bus 8).

Video memory 402 competes initially with a 1 which loses to the 0 data values provided by memory modules 401 and 403. The low signal output of memories 401 and 403 bring down the bus to a low state. Within the bus arbitration circuit of video memory module 402, a comparison is made between the low state of the bus and the high output transmitted. Recognizing the difference, video memory module 402 ceases to compete.

Video memory 401 and video memory 403 remain in contention. Shift registers 401a and 403a, both serially shift a 1 on to the video data bus 8. The bus being high and both data values being high, a high value is returned to each bus arbitration circuit. As the output and input values match there is a tie, and a new bit of priority value data is provided by shift registers 401a and 403a.

Video memory module 401 and video memory module 403 provide a 0 and a 1 respectively. In this event, it is video memory module 401 which pulls down the bus from it high state. Video memory module 403, sensing that the value returned to it is different from the value it transmitted, ceases to transmit data on to video data bus 8. Thereafter, video memory module 401 serially shifts video data 011 representing textual character data on to the video data bus 8. Once the video data is serially loaded on to the video data bus, a new clock signal on the START and LOAD leads from the video data bus 8 causes the beginning of a new contention.

With the addition of each new video memory module to the system depicted in FIG. 4, a new solid object may compete for display. It may be useful, therefore, to provide a number of object video memory modules.

If the video memory modules are provided with connectors for plug and jack connection to processor data bus 2 and video data bus 8, the flexibility of modular construction of a digital video display system is provided. A basic system might simply include a video memory module for background information and a second module for textual character generation. Additional processor and memory modules comprising bus arbitration circuits may be easily added by plug and jack connection to buses 2 and 8.

What is claimed is:

1. A digital image display system including a data processor (1), a video memory (4) for storing picture element data, and a video controller (6) characterized in that the video memory comprises:
   a plurality of memory modules (VM1-VMN), each memory module containing both picture element data for a video display (7) and associated priority value data indicative of a spatial depth relationship between picture element data in the memory module and picture element data in other of the plurality of memory modules; and
   at least one bus arbitration circuit associated with the video memory, the bus arbitration circuit being responsive to the priority value data for controlling selection of the picture element data for displaying on the video display.

2. A digital image display system including a data processor (1), a video memory (4) for storing picture element data, and a video controller (6) CHARACTERIZED IN THAT the video memory comprises:
   a plurality of memory modules (VM1-VMN), each memory module containing both picture element data for a video display (7) and associated priority value data indicative of a spatial depth relationship between picture element data in the memory module and picture element data in other of the plurality of memory modules;
   a video data bus (8) for transmitting the picture element data in the plurality of memory modules to the video controller; and
   at least one bus arbitration circuit (BAC1) connected to the video data bus, the bus arbitration circuit being responsive to the priority value data for controlling picture element data access to the video data bus.

3. A digital image display system as recited in claim 2 further characterized in that
   each of the plurality of memory modules (VM1-VMN) comprises a bus arbitration circuit (BAC1-BACN).

4. A digital image display system as recited in claim 3 further characterized in that:
   the bus arbitration circuits in the plurality of memory modules in combination controlling the contention of picture element data to access the video data bus (8).

5. A digital image display system as recited in claim 4 characterized in including:
   a particular video memory module connectable by plug and jack arrangement between the video data bus (8) and a processor data bus (2), the processor data bus connecting the data processor to the video memory and the video controller.

6. A digital image display system including a video memory (4) for storing picture element data and a video controller (6)
   characterized by:
   a video data bus (8) for connecting the video memory to the video controller;

a plurality of video memory modules (VM1-VMN) in the video memory being connected to the video data bus (8), each memory module containing both picture element data for a video display (7) and associated priority value data indicative of a spatial depth relationship between picture element data in the memory module and picture element data in other of the plurality of memory modules; and a bus arbitration circuit (BAC1-BACN), associated with each video memory module (VM1-VMN) and responsive to the priority value data for controlling picture element data access to the video data bus (8).

7. A digital image display system as recited in claim 6 further characterized by:

a data processor (1) for establishing a level for the priority value data assigned to particular picture element data in proportion to the relative spatial depth of the picture element data with other picture element data in a particular frame (5 or 300) for display.

8. A digital image display system including a data processor, a video memory for storing picture element data, and a video controller
characterized by:
a bus arbitration circuit (BAC1-BACN) in the video memory for controlling picture element data access to a video data bus (8), the bus arbitration circuit operably responsive to priority value data associated with the picture element data in determining the priority of the picture element data with other picture element data for display.

9. A digital image display system as recited in claim 8 further characterized in that
the video memory (4) includes a video memory module, having access to the video data bus through the bus arbitration circuit, for providing background picture element data.

10. A digital image display system including a data processor, a video memory for storing picture element data, and a video controller
characterized in that:
the video memory (4) comprises at least one video memory module (VM1) with a bus arbitration circuit (BAC1), the video memory module containing picture element data and priority value data, and the bus arbitration circuit being responsive to the priority value data for controlling selection of the picture element data for a position in a frame (5 or 300) of picture element data for display.

11. A digital image display system including a data processor, a video memory for storing picture element data, and a video controller
characterized in that:
the video memory comprises a plurality of video memory modules (VM1-VMN) including:
a first video memory module for providing background picture element data;
a second video memory module for providing object picture element data; and
a third video memory module for providing textual picture element data, the first, second, and third video memory modules (VM1-VMN) each having an assigned priority value indicative of the spatial depth relationship between its picture element data and picture element data in the other memory modules, and each memory module further comprising a bus arbitration circuit (BAC1-BACN) responsive to the assigned priority value of the memory module for controlling the selection of the picture element data of the memory module for display.

12. A method for compiling picture element information to provide a frame of picture element data for display comprising the steps of:
storing picture element data in a video memory for display;
characterized by the steps of:
preliminarily assigning a priority value to each of multiple picture element data stored in video memory (4) for display;
controlling access of the picture element data to a video data bus (8) by a bus arbitration circuit (BAC1-BACN) interconnecting the video memory and the video data bus;
selecting the picture element data with the highest assigned priority value for display; and
providing in order of highest assigned priority value the associated picture element data for compiling the frame of picture element information for display.

13. A method for compiling picture element information for display as recited in claim 12
further characterized by the step of
changing the priority value assigned particular picture element data.

14. A method for compiling picture element information for display as recited in claim 12
further characterized by the steps of
changing the priority value assigned particular picture element data for display and simultaneously,
changing location coordinates of the particular picture element data for display after a frame comprising the particular picture element data is compiled and before a new frame comprising the particular picture element data is compiled.

15. A method for compiling picture element information to provide a frame of picture element data for display comprising the steps of:
storing picture element data in a video memory and providing the picture element data to a video controller for display;
characterized by the intermediary steps of:
assigning a priority value to picture element data stored in each of multiple video memory modules (VM1-VMN) within the video memory;
bidding among video memory modules with assigned priority values for access to a video data bus (8); and
the winner video memory module having the picture element data with the highest assigned priority value transmitting its picture element data over the video data bus (8) to the video controller (6).

16. A method for compiling picture element information for display as recited in claim 15
further characterized in that
the recited intermediary steps are repeated with each complete frame (5 or 300) for display being transmitted over the video data bus (8) to the video controller (6).

17. A method for compiling picture element data to provide a frame of picture element data for display, comprising the steps of:
addressing a video memory with picture element data (4) and providing the picture element data to a video controller for display;
characterized by the steps of:

providing a plurality of memory modules (VM1-VMN) in the video memory for storing the picture element data, at least one priority value associated with the picture element data in one of the plurality of memory modules representing the spatial depth relationship of the picture element data in the memory module with picture element data in other of the plurality of memory modules, the priority value being independent of the memory module where the picture element data is stored, and picture element data having a different priority value than other picture element data being storable in the same memory module;

resolving contention among the picture element data in accordance with the respectively associated priority value, the video memory including at least one bus arbitration circuit being responsive to the priority value for resolving the contention among the picture element data; and displaying the frame of picture element data surviving the picture element data contention resolution step.

18. Apparatus for compiling image data for display on an image display device, comprising:

a plurality of memory modules (VM1-VMN) for storing picture element data, at least one priority value associated with the picture element data in one of the plurality of memory modules representing the spatial depth relationship of the picture element data in the memory module with picture element data in other of the plurality of memory modules, the priority value being independent of the memory module where the picture element data is stored;

picture element data having a different priority value than other picture element data being storable in the same memory module; and contention resolution means (BAC1-BACN) for resolving contention among the picture element data in accordance with the respectively associated priority value, the contention resolution means including at least one bus arbitration circuit responsive to the priority value for controlling selection of the picture element data for display on the image display device.

* * * * *

UNITED STATES PATENT AND TRADEMARK OFFICE
CERTIFICATE OF CORRECTION

PATENT NO. : 4,439,760
DATED : March 27, 1984
INVENTOR(S) : James R. Fleming

It is certified that error appears in the above—identified patent and that said Letters Patent is hereby corrected as shown below:

In the Abstract, line 10, "5 to 300" should read --5 or 300--.

In the Detailed Description, column 5, line 32, "x and y", should read --$\underline{x}$ and $\underline{y}$--.

*Signed and Sealed this*

*Twenty-third* Day of *October 1984*

[SEAL]

*Attest:*

GERALD J. MOSSINGHOFF

*Attesting Officer*   *Commissioner of Patents and Trademarks*

Disclaimer 4,439,760.—*James R. Fleming*, Indianapolis, Ind. METHOD AND APPARATUS FOR COMPILING THREE-DIMENSIONAL DIGITAL IMAGE INFORMATION. Patent dated Mar. 27, 1984. Disclaimer filed Dec. 9, 1985, by the assignee, *Bell Telephone Laboratories, Inc.*

Hereby enters this disclaimer to claims 1, 8, 10, 15, 16, 17 and 18 of said patent.

[*Official Gazette August 5, 1986.*]